United States Patent

[11] 3,595,157

[72] Inventors Philip G. Baker
Peabody;
Gerald Cook, Lynnfield; Rogers B.
Downey, Lexington, Mass.
[21] Appl. No. 838,832
[22] Filed July 3, 1969
[45] Patented July 27, 1971
[73] Assignee Polaroid Corporation
Cambridge, Mass.

[54] APPARATUS FOR RUPTURING A PROCESSING FLUID CONTAINING POD IN A PHOTOGRAPHIC CASSETTE
21 Claims, 6 Drawing Figs.

[52] U.S. Cl. .................................................. 95/89,
95/13, 95/90.5, 352/72, 352/74, 352/78, 352/130
[51] Int. Cl. ...................................................... G03d 3/00
[50] Field of Search .......................................... 95/13, 89,
90.5; 352/72, 74, 78, 130

[56] References Cited
UNITED STATES PATENTS
2,449,626   9/1948   Suthann .................... 352/74
2,797,625   7/1957   Fairbank ................... 95/89 X
3,260,186   7/1966   Lowell ...................... 95/90.5
3,322,053   5/1967   Good ........................ 95/89
3,383,998   5/1968   Takats ...................... 352/78 X
3,483,809   12/1969  Schmidt et al. ............. 95/89 X Primary Examiner—Samuel S. Matthews
Assistant Examiner—Richard M. Sheer
Attorneys—Brown and Mikulka, W. D. Roberson and R. L. Berger ABSTRACT: Apparatus for receiving a cassette containing a pod of processing fluid for photographic material, for rupturing such pod and for expelling such fluid therefrom. Typically, the fluid filled pod is mounted within the cassette adjacent a support surface and initially protected by a removable cover plate. After removing the aforementioned cover plate to expose the pod, the cassette is inserted into the apparatus against the force of a coiled spring and between a pair of rollers mounted for rotation about parallel axes. One of these rollers is mounted on an overcenter mechanism to exert a force progressively across the pod during the insertion process when the overcenter mechanism is in a first position whereby the pod is ruptured and the fluid expelled therefrom. In a first embodiment, when the cassette has been fully inserted into the apparatus, the rollers exert a downward force on the cassette to lock the cassette in position. Displacement of the overcenter mechanism into its second position withdraws the roller connected thereto from contact with the cassette permitting the spring to eject the cassette permitting the spring to eject the cassette from the apparatus. In a second embodiment a releasable latch engages a recess of the cassette to lock the cassette in position against the force exerted thereon by the ejection spring. Displacement of the overcenter mechanism into its second position simultaneously withdraws both the roller connected thereto and the latch from contact with the cassette to facilitate its ejection from the apparatus.

INVENTORS
ROGERS B. DOWNEY
PHILIP G. BAKER
GERALD H. COOK
BY Brown and Mikulka
and
Robert L. Berger
ATTORNEYS

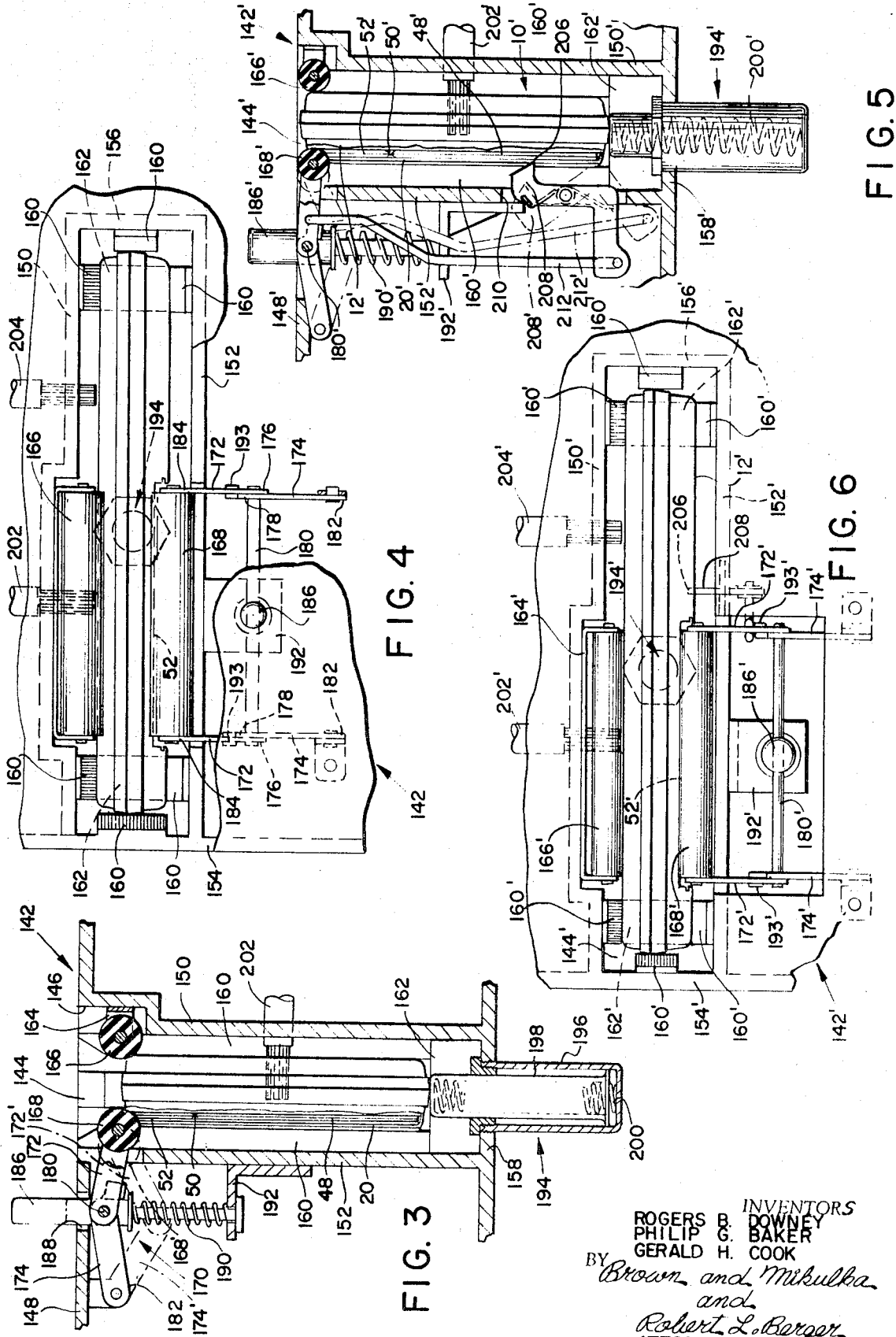

APPARATUS FOR RUPTURING A PROCESSING FLUID CONTAINING POD IN A PHOTOGRAPHIC CASSETTE

BACKGROUND OF THE INVENTION

1. Field of Invention

This invention relates to photography and, more particularly, to an improved system for releasably receiving a photographic cassette and for rupturing a pod mounted therein containing processing fluid for photographic material.

2. Description of the Prior Art

After motion picture film has been exposed in a camera, it has generally been the practice for the photographer to send the container of exposed film to a processing laboratory. At the laboratory the film is removed from the container and subjected to a series of operations in order to produce visible images from the images recorded thereon during the exposure operations. The fully developed film strip is then rewound onto a reel at the laboratory and returned to the user.

The extended delay normally incurred between the time exposed film is sent to the laboratory and returned ready for viewing has proved to be a significant inconvenience to the user and a source of great annoyance.

The field of still photography is no longer hampered by extensive periods of delay associated with the processing of exposed film. The impact on the public of the one-step photographic process employing diffusion transfer techniques is a matter of record and generally well known. The home still photographer can now enjoy the fruits of his efforts in a matter of seconds. This important convenience has been available to the amateur still photographer for many years.

Most recently, important technological advances have made it possible for the home photographer interested in motion pictures to enjoy this same convenience. Radically different systems have now been developed which permit the photographer himself to quickly and easily process and project a strip of motion picture film shortly after the pictures have been taken. Exemplary of such new and unique systems are those described in the following copending applications:

| Ser. No. | Inventor(s) | Filing Date |
| --- | --- | --- |
| 755,901 | Edwin H. Land | Aug. 28, 1968 |
| 761,771 | Rogers B. Downey | Sept. 23, 1968 |
| 767,609 | Herbert A. Bing | Oct. 15, 1968 |
| 766,481 | Rogers B. Downey | Nov. 18, 1968 |
| 722,789 | Vaito K. Eloranta Benjamin C. Ruggles | Nov. 1, 1968 |
| 788,897 | Rogers B. Downey | Jan. 3, 1969 |
| 813,427 | Rogers B. Downey | Apr. 4, 1969 |
| 813,469 | Rogers B. Downey | Apr. 4, 1969 |
| 813,586 | Rogers B. Downey Paul W. Thomas | Apr. 4, 1969 |
| 838,822 | Rogers B. Downey Gerald H. Cook | July 3, 1969 |
| 838,783 | Rogers B. Downey Philip G. Baker Gerald H. Cook | July 3, 1969 |
| 838,794 | Rogers B. Downey | July 3, 1969 |
| 838,793 | Philip G. Baker | July 3, 1969 |

All of these copending applications are assigned to the assignee of the present invention. Each of the systems described in the aforementioned copending applications most advantageously employee a cassette from which the film need not be removed during exposure, processing and projection operations.

In commercial and industrial operations, such rapid motion picture processing systems are not only an improvement as a matter of convenience, but have other important effects as well. For instance, motion picture newsreel programs can be presented on television to the viewing public shortly after events of interest have occurred and have been photographed.

In some of these new systems the processing fluid is initially stored in a dispensing container having an applicator, in some the processing fluid is initially stored in a frangible container from which it is later released into a reservoir of the cassette to facilitate the processing operation, while in still others the processing fluid is initially stored in arupturable pod from which it can be expelled into an applicator at the proper time. Considerable funds and effort are currently being expended to further improve and refine various features of these systems in order to reduce their cost, to further simplify the task of the operator, to improve their reliability, and to improve the quality of the final product. The present invention is directed to an improved system for receiving a cassette of the type in which the processing fluid is initially contained in a pod, for rupturing that pod, for expelling the processing fluid from that pod and for subsequently ejecting the cassette. In its preferred embodiment, the system of this invention is adapted to facilitate the combined functions of processing and projecting the strip of motion picture film housed in the cassette, the overall system being adapted for operation by the photographer himself.

One of the objects of this invention, therefore, is to provide an improved system for rupturing a fluid containing pod.

Another primary object of this invention is to provide an improved system for receiving a motion picture film handling cassette containing a rupturable pod of processing fluid and for automatically rupturing that pod and expelling the fluid therefrom in the process of receiving such cassette.

An additional object of this invention is to provide an improved system for receiving a film handling cassette, for locking that cassette into position within the receiving means and for selectively ejecting the cassette from the receiving means.

A further object of this invention is to provide a system for receiving a film handling cassette containing a rupturable pod of processing fluid and in which a force applying member serves the dual function of expelling the fluid from the pod during the insertion process and of locking the cassette in position when the cassette has been fully inserted into the receiving means.

Also, an object of this invention is to provide a system of the type indicated in which the member adapted to rupture the cassettes pod is mounted on an overcenter mechanism whereby it may be selectively displaced into and out of operable relationship with the cassette's pod.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiments when read in connection with the accompanying drawings wherein like numbers have been employed in the different figures to denote the same parts and wherein:

FIG. 3 is a fragmentary diagrammatic vertical sectional view of the apparatus of the present invention illustrating the cassette shown in FIGS. 1 and 2 inserted into the cassette receiving means of that apparatus;

FIG. 4 is a partially cutaway plan view of the embodiment of this invention illustrated in FIG. 3;

FIG. 5 is a fragmentary diagrammatic vertical sectional view of another embodiment of the present invention illustrating the cassette shown in FIGS. 1 and 2 inserted into the cassette receiving means of that apparatus; and FIG. 6 is a partially cutaway plan view of the embodiment of this invention illustrated in FIG. 5.

SUMMARY OF THE INVENTION

Figure 1:
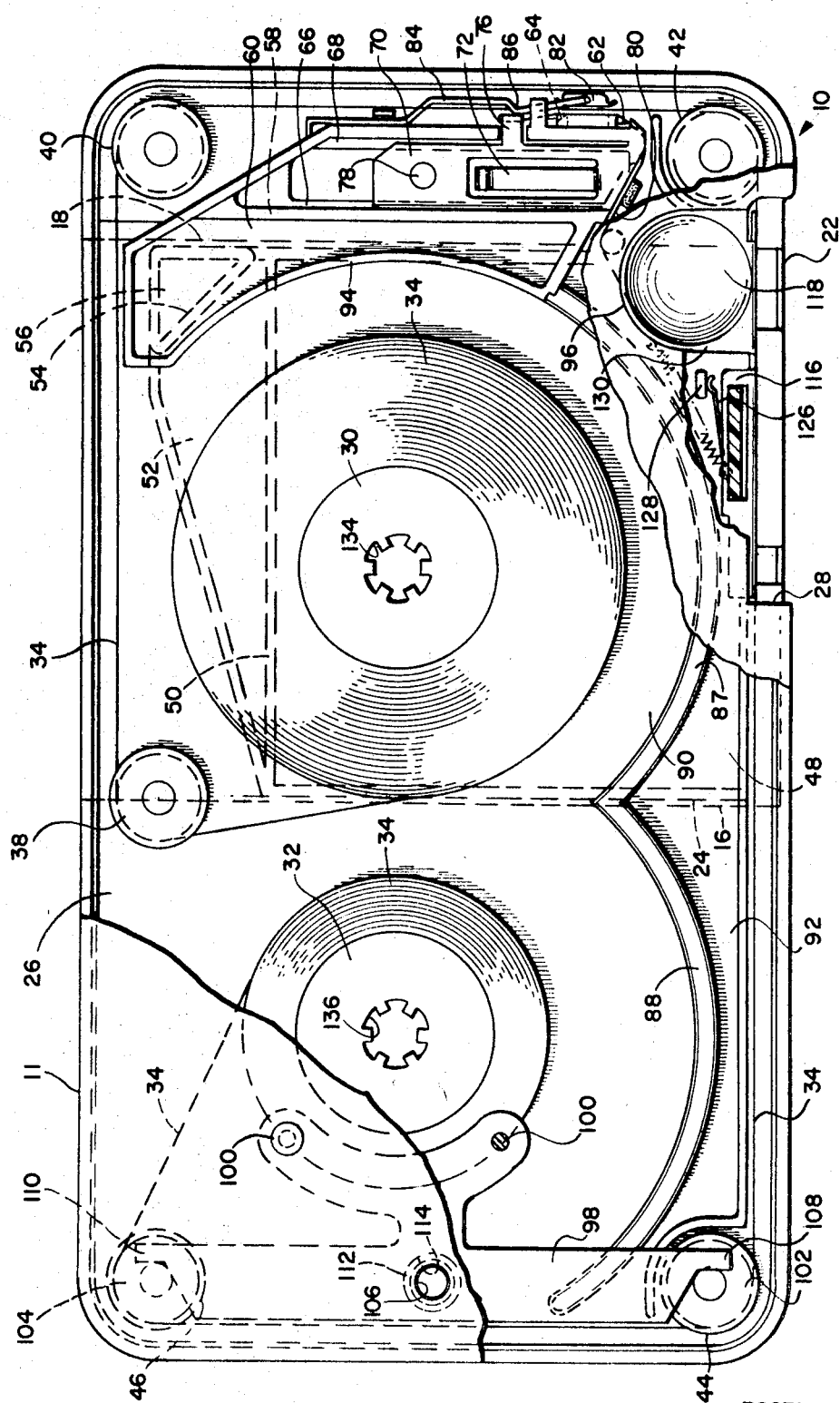
FIG. 1 is a diagrammatic cutaway plan view of a compact multipurpose motion picture film handling cassette of a type with which the present invention is adapted to be employed.

In its illustrated preferred embodiments, the apparatus of this invention is adapted to operate with compact multipurpose film handling cassettes to facilitate the processing of the photographic material contained therein and the subsequent projection of the visible images produced during the processing operation. Each such cassette includes a rupturable processing fluid containing pod adapted to have an externally mounted force applying member pressed thereagainst. Such cassette also houses an applicator in communication with the rupturable pod so that fluid expelled from the pod is fed thereto. Means within the cassette are adapted to be driven by externally mounted drive means to progressively advance the film strip within the cassette across the applicator whereby a coating of processing fluid is applied along the length of the film strip.

The processing unit, which as indicated, may also serve as a projector, includes a receiving chamber into which the cassette may be inserted. A pair of rollers are mounted adjacent the entrance to the receiving chamber on parallel axes of rotation, one such roller being mounted from an overcenter mechanism and the other such roller having a fixedly positioned axis of rotation. As the cassette is introduced into the receiving chamber with the overcenter mechanism in a first position, it is pressed between these two rollers so that the roller mounted on the overcenter mechanism contacts the rupturable pod and exerts a force progressively across its entire length. Simultaneously, the other roller acts to support the cassette against the force exerted thereon by the pod rupturing roller. Thus, in the course of the insertion process, these rollers effect a rupturing of the cassette's pod and cause the fluid contained therein to be expelled therefrom. The receiving chamber further includes a support surface against which the cassette is seated when fully inserted thereinto and the apparatus also includes a coiled spring which is automatically loaded as the cassette is inserted into the receiving chamber.

In a first preferred embodiment at least the roller having the fixedly positioned axis of rotation is formed of a resiliently compressible material. Also, with the overcenter mechanism in its first stated position, both rollers are located a sufficient distance above the support surface of the receiving chamber so as to extend over the end of the cassette furtherest removed therefrom when the cassette is seated against that surface. Thus, they exert a force against the cassette firmly pressing the cassette against that surface. The processor also includes a pair of drive shafts adapted to engage the film advancing means of the cassette once the cassette has been inserted thereinto. After the processing and/or projection operations have been completed, the overcenter mechanism may be displaced into its second position wherein the roller mounted thereon exerts substantially no force against the cassette thereby permitting the loaded spring to eject the cassette from the receiving chamber.

In a second embodiment the rollers do not exert a force against the cassette tending to press it against the support surface of the cassette receiving means. Rather the apparatus includes a releasable latch adapted to automatically engage a recess of the cassette when the cassette is fully inserted therein to lock the cassette in position against the force exerted thereon by the loaded spring. Preferably, this latch is connected to the overcenter mechanism whereby the roller connected to that mechanism and the latch are simultaneously withdrawn from contact with the cassette to permit the loaded spring to eject the cassette from the apparatus.

DESCRIPTION OF A PREFERRED EMBODIMENT

A preferred embodiment of this invention is illustrated as facilitating the application of a compatible processing fluid to a film structure which comprises both a photosensitive image-recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide transfer-reversal processes for the production of black-and-white images, a silver halide developer and a silver halide solvent are applied in an aqueous alkaline solution to a photoexposed silver halide stratum or emulsion where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver receptive and silver halide strata in order to render the positive image visible, particularly when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver deposited upon it, in comparison with silver developed in the silver halide stratum, to possess very high covering power, i.e. opacity for a given mass of reduced silver. If the silver halide is in such a concentration as to give rise only when fully developed to a predetermined low maximum density, and if the silver complex is reduced to silver in a vigorous silver precipitating environment, the resulting negative and positive images in superposition provide a composite that presents a good image for projection purposes as long as the images are carried on a light-transmitting support. Since the silver halide stratum and the silver receptive stratum need not be separated, a simplication of the overall silver halide diffusion transfer-reversal process is achieved.

A composite film assembly of this type is well as processing compositions for producing a stable black-and-white image which can be viewed by transmitted light without the necessity of removing the processed negative image-containing photosensitive layer is shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U.S. patents of Edwin H. Land Nos. 2,726,154 issued Dec. 6, 1955 and 2,944,894 issued July 12, 1960. All of these prior patents are assigned to the assignee of the present invention.

However, it should be noted that the present invention is not directed to the chemistry by which visible images are formed in an exposed photosensitive material and/or formed in an image receiving stratum associated therewith. While an illustrated preferred embodiment of this invention is shown effecting the application of a compatible processing fluid to a film structure not requiring the removal of the photosensitive layer after visible image formation is completed, the invention itself is also applicable for use with other types of processing fluids and film structures.

Figure 2:
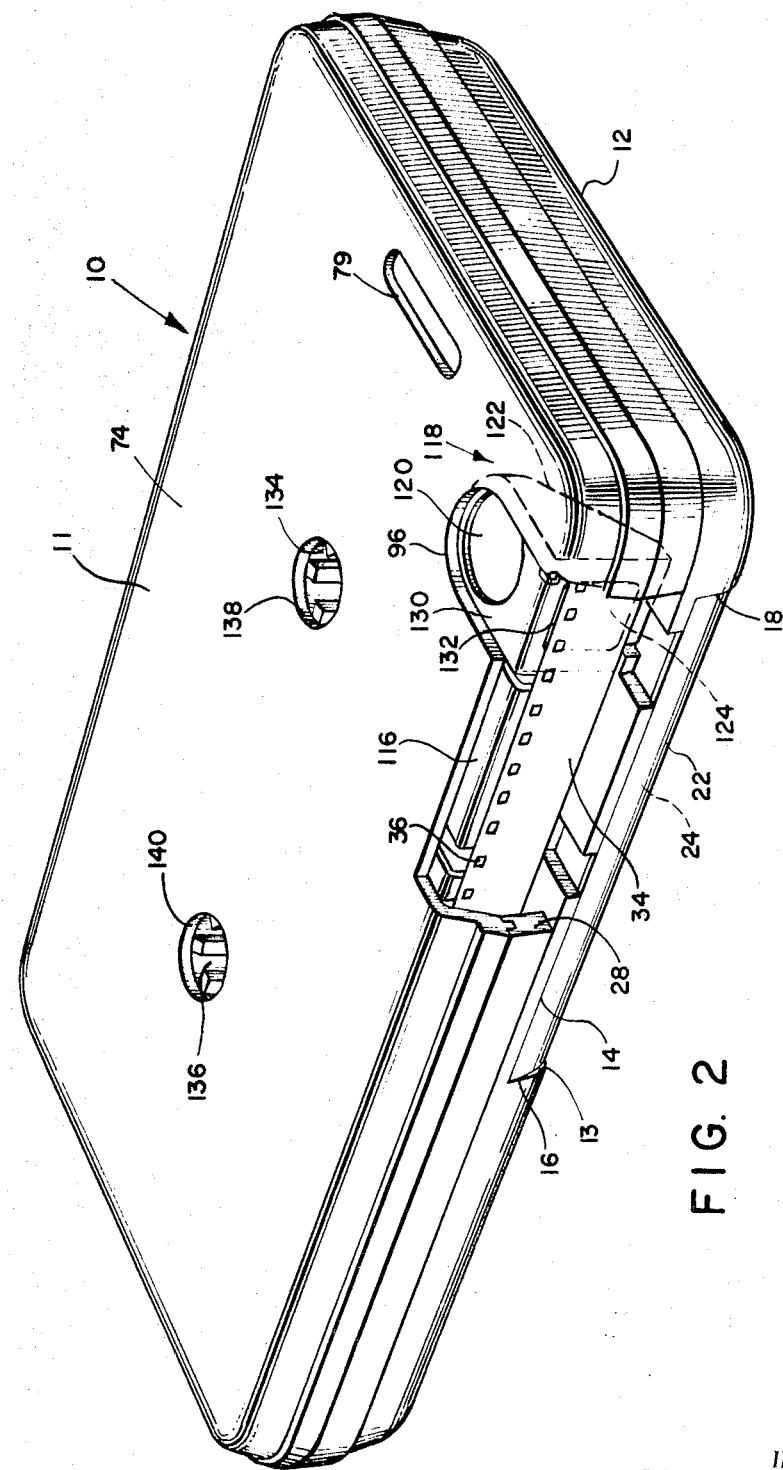
FIG. 2 is a diagrammatic perspective view of the cassette illustrated in FIG. 1.

The illustrated preferred embodiment of this invention may be best understood by first referring to FIGS. 1 and 2 of the drawings, which illustrates a cassette typical of the type with which the present invention is intended to operate. As shown therein, a compact multipurpose film handling cassette 10 is basically constituted by a pair of housing members 11 and 12 connected together to form an enclosed opaque housing. The housing member 12 is provided with a recessed portion 13 consisting of a support surface 14 disposed between a pair of opposed walls 16 and 18. Formed in respective opposed walls 16 and 18 are elongated parallel grooves 20 (see FIG. 4) which are adapted to slidably receive a removable cover plate 22. Thus, the support surface 14, the opposed walls 16 and 18 and the removable cover plate 22 in combination define an enclosed section 24 separated from a main section 26 of the cassette 10.

Cutout portions of the housing members 11 and 12 define an opening 28 through which image carrying light rays may enter and/or leave the cassette 10 and, further, through which an aperture plate of a camera or of a projector may be introduced into the cassette. In this embodiment, the cassette 10 is relatively flat and generally rectangular parallelepiped in configuration. A supply spool 30 and a takeup spool 32 are coplanarly mounted within section 26 of the cassette 10 for rotation about parallel axes. A strip of unexposed photographic material 34, of the type previously discussed and provided with perforations 36 and leaders affixed to the supply spool 30 and to the takeup spool 32, is initially substantially entirely coiled around the supply spool. Passing from the supply spool 30 to the takeup spool 32, the strip of photographic material 34 sequentially travels around idlers 38, 40, 42, 44 and 46. Advantageously, the idlers 42 and 44 are positioned in opposite corners or extremities of the cassette 10 on the same side of the supply spool 30 and the takeup spool 32. Additionally, the idler 40 is advantageously positioned in the corner of the cassette 10 disposed on the other side of the supply spool 30 from the takeup spool 32 and on the opposite side of those spools from the idlers 42 and 44.

A rupturable pod 48 is positioned in the section 24 of the cassette 10 adjacent the support surface 14. The nature of this pod and the means by which it is ruptured will be described in considerable detail hereinafter. However, at this point it should be noted that this pod 48 includes a weakened seal 50 connected to a fluid feeding device 52 provided with an exit orifice 54. This orifice 54 in turn communicates through an opening 56 in the housing member 12 with a fluid reservoir chamber 58 of a dispensing container 60. Extending from the dispensing container 60 is a rectangular projection 62 which defines an orifice through which processing fluid within the reservoir chamber 58 may be expressed from the dispensing container. One edge of the end of the projection 62 is formed with a taper 64, the purpose of which will subsequently become obvious.

Guide tracks 66 and 68 are formed in an outside face of the dispensing container 60 for purposes of slidably receiving an actuator 70. This actuator 70 is formed with a leaf spring 72, which engages the inside face of the wall 74 of the cassette 10 to firmly seat the actuator in the guide tracks 66 and 68, and further, with a tang 76 extending over and across the side of the dispensing container 60 from which the projection 62 extends. A circular aperture 78 in the actuator 70 is positioned in alignment with an elongated slot 79 passing through the cassette's wall 74 in order that an externally mounted force applying member may be received thereinto for purposes of effecting an upward displacement of the actuator along the guide tracks 66 and 68 from its position as shown in FIG. 1 of the drawings. One end of a strip of flexible material 80 is spring mounted to the structure of the cassette 10 while its other end is connected to the tang 76. This strip of flexible material 80 is disposed over the end of the rectangular projection 62 and includes an opening positioned to be out of alignment with the orifice of that projection when disposed in the position illustrated in FIG. 1 and so as to be in alignment with that orifice when the actuator 70 is displaced to its upwardmost position along the guide tracks 66 and 68.

Additionally, a support member 82 is pivotably connected between the ends of a uniquely configured U-shaped spring 84 mounted on the dispensing container 60. It will be noted that this U-shaped spring 84 includes an offset 86 adapted to be engaged by the tang 76 when in its position as shown in FIG. 1.

Intermediate the idlers 40 and 42, the strip of photographic material 34 is disposed between and in spaced apart relationship to the strip of flexible material 80 and the support member 82. However, it will be appreciated that when the actuator 70 is displaced upwardly, the tang 76 is removed from contact with the offset 86 in the spring 84 thereby permitting the support member 82 to slidably engage the strip of photographic material 34 against that section of the strip of flexible material 80 disposed across the projection 62. Thus, when the container 60 is sealed by the strip of flexible material 80 and the strip of photographic material 34 may be transported between and out of contact with that strip of flexible material and the support member 82. Also, whenever the actuator 70 is moved upwardly along the guide tracks 66 and 68, the strip of flexible material 80 is displaced into an unsealing relationship with the dispensing container 60 and the support member 82 slidably engages the strip of photographic material 34 against the strip of flexible material.

The rupturable pod 48 initially contains a quantity of processing fluid suitable to form visible images from the images recorded on the strip of photographic material 34 during exposure operations. Typically, the walls of the rupturable pod 48 consist of an outer layer of pouch or glassine paper, an intermediate layer of lead foil and an inner layer of polyvinylchloride material. The polyvinylchloride layers are bonded together adjacent their edge portions to effect the sealing of the fluid filled cavity with the seal 50 being substantially weaker than the seals around the other edges of the pod 48. Typically, the walls of the fluid feeding device 52 are formed of an outer layer of pouch or glassine paper bonded to an inner layer of polyethylene material. Again the polyethylene material layers may be bonded together where appropriate and also bonded to the outer layer of the walls of the pod 48 to connect the fluid feeding device to the pod. Preferably, the outside surface of the assembly comprising the pod 48 and the fluid feeding device 52 adjacent the support surface 14 is adhered thereto by any suitable means to facilitate fixedly positioning that assembly within the cassette's enclosed section 24.

It should be noted that the capacity of the reservoir chamber 58 of the dispensing container 60 should be equivalent to or greater than that of the rupturable pod 48. For instance, approximately 2 cc. of processing fluid is sufficient to treat 50 feet of Super-8 format film. Under such conditions, the pod 48 will have a capacity of 2 cc. and the capacity of the dispensing container's reservoir chamber 58 will be on the order of 2 to 2½ cc. It will be appreciated that the application of a compressive force progressively along the length of the pod 48 toward its weakened seal 50 and across the fluid feeding device 52 will first effect a rupturing of the pod along the seal 50 and then cause the processing fluid initially stored therein to be expelled therefrom into the dispensing container's reservoir chamber 58.

Mounted between the housing member 12 and the wall 74 of the housing member 11 is a light sealing arcuate member 87, one end of which is positioned against the dispensing container 60. The other end of the member 87 is connected to one end of a second light sealing arcuate member 88 which extends to within the vicinity of the idler 44. These arcuate members 87 and 88, in combination with the dispensing container 60, serve to effectively divide the section 26 of the cassette 10 into a first compartment 90 sealed in a light-tight manner from a second compartment 92. Additionally, it will be noted that in the illustrated embodiment of the cassette, the supply spool 30, the light sealing arcuate member 87 and a wall 94 of the dispensing container 60 share a common axis. Thus, the arcuate member 87 and the wall 94 further serve to control the disposition of that portion of the strip of photographic material 34 coiled around the supply spool 30 within the cassette 10. Similarly, the takeup spool 32 and the light sealing arcuate member 88 share a common axis and, consequently, the arcuate member 88 serves to control the disposition of the portion of the strip of photographic material 34 coiled around the takeup spool within the cassette 10.

It should also be noted at this point that the wall 74 of the cassette 10 is provided with an opening 96 communicating with the aforementioned opening 28 of the cassette. As will subsequently become more apparent, this opening 96 permits light rays from an external light source to be introduced into the cassette 10 for film projection purposes.

As shown in FIG. 1, a resilient member 98 is connected to rivets 100, and extends over and in spaced relationship to the end surfaces 102 and 104 of the idlers 44 and 46, respectively. Provided in the wall 74 is an aperture 106 disposed over the resilient member 98 whereby an external force applying member may be selectively introduced into the cassette 10 to urge the resilient member's end portions 108 and 110 into frictional engagement with the idlers 44 and 46, respectively, to restrain further rotational movement of those idlers. In order to effectively light seal the interior of the cassette 10, a ring 112 mounted on the resilient member 98 is coaxially disposed with respect to the aperture 106 and adapted to seat in an annular recess 114 of the wall 74.

Mounted within compartment 92 of the cassette 10 so as to be in alignment with the opening 28 is a pressure plate assembly 116 in which is mounted a light reflecting element 118. It will be noted that this light reflecting element 118 is disposed in operable relationship to both the opening 28 and the opening 96 of the cassette 10. In the illustrated embodiment of the cassette, the light reflecting element 118 is prismatic in nature and includes a concave light receiving transparent face 120 and a flat reflecting surface 122 which reflects light received into the element through the light receiving face 120 outwardly thereof through a convex transparent face 124.

The pressure plate assembly 116 includes a leaf spring 126 which seats against a boss 128 formed integrally with the housing member 12 to continually urge the pressure plate assembly toward the cassette's opening 28. The pressure plate assembly 116 is mounted within the cassette 10 so that it may be displaced inwardly of the cassette from the opening 28 against the force of the spring 126 when the aperture plate of a camera or a projector is positioned in operative relationship therewith. Forming part of the pressure plate assembly 116 is a mounting bracket 130 which serves to fixedly position the light reflecting element 118 with respect to the pressure plate assembly and, more particularly, with respect to an aperture 132 of that assembly.

The spools 30 and 32 are respectively provided with fluted recesses 134 and 136 which are adapted to receive externally mounted drive means through apertures 138 and 140 appropriately provided through the cassette's wall 74. Thus, the cassette 10 includes means for reversably transporting the strip of photographic material 34 between the supply spool 30 and the takeup spool 32 across the dispensing container's projection 62 and the pressure plate assembly 116. The cassette's opening 28 constitutes a film gate adapted to serve as an exposure station during a first pass of the photosensitive film strip 34 across the pressure plate assembly 116 and as a projection station during subsequent operations in which the film strip, in a fully processed condition, is advanced from the supply spool 30 to the takeup spool 32.

Idler 42, around which the filmstrip 34 passes on its way from the supply spool 30 to the pressure plate assembly 116 may, if desired, be mounted on a movable post spring biased toward the corner which it occupies in the housing of the cassette 10 and capable of being moved resiliently inward away from that corner. Also, idler 44 may be spring biases toward the corner which it occupies in the housing in the cassette 10 and capable of being moved resiliently inward away from that corner. This represents one way to minimize strain exerted on the film strip 34 by the conventional intermittent film advancement structure during these exposure and projection operations. It will be appreciated that the housing members 11 and 12, as well as elements associated therewith, e.g., the light sealing members 87 and 88, and the boss 128 may, for example, be formed from a suitable thermoplastic resin such as an acrylic or a polystyrene, in an inexpensive ejection molding process. Similarly, the dispensing container 60, the idlers 38, 40, 42, 44 and 46 and the cover plate 22 may be formed by injection molding processes employing the same types of material.

While the various details of the cassette 10 do not constitute part of the present invention, they have been illustrated and briefly described for purposes of imparting a complete understanding of the present invention. Obviously, certain of these features may readily take other forms than that described. Some of the features of the illustrated cassette embodiment, e.g., the rupturable pod-fluid feeding device assembly, the snubbing arrangement, the applicator system, the pressure plate assembly, the light reflecting element and the film gate arrangement, are the subject of certain of the aforementioned copending applications.

As previously indicated, the present invention is directed to an improved apparatus for receiving and selectively ejecting such cassettes, for rupturing the fluid containing pod of such cassettes, for expelling the fluid initially stored therein into the cassette's applicator system and for effecting the coating of the cassette's film strip with such fluid. Preferably, the features of the present invention are incorporated into a unit which not only facilitates the processing of the cassette's film strip but which also subsequently facilitates the projection, for viewing purposes, of the visible images formed on the film strip during the processing operation.

Referring now to FIGS. 3 and 4 of the drawings, a processor-projector unit 142 is illustrated that includes a cassette receiving chamber 144. After the strip of photographic material 34 has been exposed with the cassette 10 mounted in an appropriate camera (not shown) in its travel from the supply spool 30 onto the the takeup spool 32 and before inserting the cassette into the processor-projector unit 142, the cover plate 22 is removed. Insertion of the cassette 10 into the receiving chamber 144 is effected through a slot 146 provided in the top panel 148 of that unit and with the side of the cassette containing the opening 28 first passing through that slot.

The cassette's receiving chamber 144 is formed of interconnected support plates 150, 152, 154, 156, and 158. A plurality of elongated standoffs 160, mounted in vertical alignment on the support plates 150, 152, 154 and 156 and extending from those plates interiorally of the cassette receiving chamber 144, and a pair of standoffs 162, extending between the support plates 150 and 152, in combination, serve to first guide the cassette 10 into that chamber, and once the cassette has been fully inserted therein, to support and align the cassette. Typically, the support plates 150, 152, 154, 156 and 158 are formed from a material such as stainless steel while the standoffs 160 and 162 are formed from a polymeric material such as polytetrafluorathylene. When fully inserted into the receiving chamber 144, the cassette 10 is seated against the standoffs 162. Preferably, the cassette receiving chamber 144 is oriented within the processor-projector unit 142 so that the cassette 10 is inserted vertically downward thereinto (as viewed in the drawings) through the slot 146.

Extending inwardly of the receiving chamber 144 from the support plate 150 is a bracket 164 which rotatably supports a roller 166. A roller 168 is mounted on an overcenter mechanism 170 so as to be disposed on the other side of the cassette 10 within the receiving chamber 144 when the cassette is inserted into that chamber. In this connection, the overcenter mechanism 170 includes two pairs of parallel arms 172 and 174 having respective adjacent ends 176 and 178 pivotally connected to opposite ends of a rod 180. The other ends 182 of the arms 174 are pivotally connected to the structure of the processor-projector unit 142. The roller 168 is rotatably mounted from and extends between the other ends 184 of the arms 172. Pivotally connected to the rod 180 is a button 186 which extends through an aperture 188 in the processor-projector's top panel 148. A spring 190, mounted between the button 186 and a flange 192 extending from the support plate 152, continually urges the button toward its upwardmost position as viewed in FIG. 3 of the drawings. Such upward movement of the button 186 and the rod 180 is limited by a pair of lips 193 extending from the ends 178 of the arms 174 so as to respectively contact the arms 172. When the button is in that position, the arms 172 and 174, and more importantly the roller 168, are disposed as depicted in FIG. 3 under the force of the spring 190.

In this embodiment of the invention the roller 166, or at least its peripheral surface, should be formed of a resiliently compressible material such as hard rubber. The roller 168 may also be formed of a similar type material. In any event, it will be noted that the rollers 166 and 168 are mounted on parallel axes of rotation and, when the overcenter mechanism 170 is in its position shown in FIG. 3, the peripheral surface of these rollers are disposed slightly closer together than the width of the cassette 10. More specifically, their diameters are such, and their axes of rotation are spaced apart so, that the roller 168 firmly presses against the cassette's rupturable pod 48 as the cassette 10 is inserted into the receiving chamber 144. Simultaneously, the roller 166 supports the cassette against the force exerted thereon by the roller 168. In this respect, the roller 168 is positioned to be in alignment with the recessed portion 13 of the cassette's housing member 12 as the cassette 10 is inserted into the receiving chamber 144 and, further, is of a length slightly less than the distance between the opposed walls 16 and 18 of that portion of the cassette. It will be recognized that, during this insertion process, the cassette 10 exerts a force against the rollers 166 and 168 causing them to be somewhat compressed.

As the cassette 10 is partially inserted into the receiving chamber 144, the roller 168 initially contacts the end of the rupturable pod 48 furthermost disposed from its weakened seal 50. In the course of completing the insertion process, that roller 168 progressively applies a force against the pod 48 toward its weakened portion 50 and across the feeding device 52. Thus, as the cassette is inserted into the receiving chamber 144, the roller 168 automatically effects a rupturing of the pod 48 and causes the processing fluid initially stored therein to be expelled therefrom into the fluid reservoir chamber 58 of the dispensing container 60.

These rollers 166 and 168 are also positioned a carefully predetermined distance above the standoffs 162 so that, when the cassette 10 is seated against those standoffs, a portion of each of those rollers extend above the opposite end of the cassette. The arrangement permits the rollers 166 and 168 to expand over that end of the cassette 10 to firmly press the cassette against the standoffs 162 to "lock" the cassette within the receiving chamber 144.

As depicted in FIG. 3, the pod's weakened seal 50 has been ruptured, the processing fluid expelled from between the opposed walls of that pod 48 through the fluid feeding device 52 into the dispensing container's reservoir chamber 58 and the cassette 10 is "locked" in position within the receiving chamber 144 of the processor-projector unit 142 by the rollers 166 and 168.

Extending through the processor-projector unit's support plate 158 is a telescoping container 194 comprising a first section 196 fixedly mounted to the support plate 158 and a second section 198 slidably disposed within the telescoping container's first section. A compression spring 200 housed within the container 194 continually urges the two sections 196 and 198 of that container into their fully extended positions. This container 194 is positioned so as to be engaged by and compressed into its loaded condition as depicted in FIG. 3 by the cassette 10 as the cassette is inserted into the receiving chamber 144. When loaded, the spring 200 tends to eject the cassette 10 from the processor-projector unit 142. However, as indicated, as long as the overcenter mechanism 170 is in its position shown in FIG. 3, the rollers 166 and 168 act against the cassette 10 to restrain the cassette in the receiving chamber 144 against the force exerted thereon by the spring 200.

By subsequently depressing the button 186, the operator can displace the roller 168 into its position shown in phantom in FIG. 3 wherein it is disposed out of contact with the cassette 10. At such time, the force of the spring 200 acting against the cassette 10 will effect an ejection of the cassette from the processor-projector unit 142. In this respect, the spring 200 must be carefully selected so as to exert a sufficient "ejecting force" against the cassette to overcome the downwardly directed force still exerted thereon by the expanded roller 166. Obviously, the force of this spring when loaded must be insufficient to overcome the downwardly directed forces exerted against the cassette 10 by both the rollers 166 and 168 when the latter roller is disposed in its most inwardly position within the receiving chamber 144. Once the cassette has been ejected, the depressed button 186 may be released and the force of the spring 190 automatically returns the overcenter mechanism 170 and the roller 168 mounted therefrom into their original positions. As may be seen in FIG. 3, as the mechanism 170 is displaced from its initial position to its position shown in phantom, the rod 180 passes "over-center." This arrangement, in combination with the contact between the lips 193 extending from the arms 174 and the arms 172, precludes any possibility of an upward or downward movement of the rod 180 responsive to the force exerted on the rollers 168 by the cassette 10 during the cassette insertion process. Such an arrangement also facilitates the subsequent withdraw of that roller 168 from contact with the cassette for cassette ejection purposes.

It is preferred that the spring 200 be configured to displace the cassette 10 upwardly within the receiving chamber 144 to a position where it is easily accessible for manual removal from the unit 142, rather than to actually propel the cassette from that unit. However, it is to be understood that as used herein the terms "ejecting," "ejection," etc. are employed in a broad sense, i.e. to cover either of these situations.

Slidably mounted within the processor-projector unit 142 are a pair of drive shafts 202 and 204. After the cassette 10 has been fully inserted into the receiving chamber 144 of the processor-projector unit 142, these drive shafts 202 and 204 may be selectively displaced (means not shown) into engagement with the fluted recesses 134 and 136, respectively, of the cassette's supply spool 30 and takeup spool 32. These drive shafts 202 and 204 may then be alternately energized by the motor (not shown) of the processor-projector unit 142 to effect selective reversible transport of the strip of photographic material 34 within the cassette 10 between the supply spool 30 and the takeup spool 32. The processor-projector unit 142 also includes a displaceably mounted force-applying member (not shown) which may be selectively introduced through the slot 79 in the cassette's wall 74 once the cassette is fully inserted into the receiving chamber 144 to effect selective reversible displacement of the actuator 70 along the guide tracks 66 and 68.

It has been indicated that in this illustrated embodiment of the invention the roller 166 is formed of a resiliently compressible material. This is true since the cassette 10 is aligned for a straight path insertion into the receiving chamber 144 directly past this roller and because this roller must subsequently exert a downwardly directed force against the cassette. Obviously, arrangements are possible wherein the cassette slides under the roller 166 after having completed its downward travel into a receiving chamber of the processor-projector unit 148. Also, it is possible for the overcenter mechanism 170 to be designed so that the roller 168 by itself exerts a sufficient downwardly directed force against the cassette 10 to effectively "lock" that member in the receiving chamber 144. In the latter case the roller 166 need not be mounted to extend over the cassette 10. In both of these situations the roller 166, if desired, may be formed of a material such as stainless steel which is not resiliently compressible.

In this same context, the roller 168 may, if desired, be formed of a material such as stainless steel rather than of a resiliently compressible material, if the linkage comprising the arms 172 and 174 is designed with sufficient flexibility to resiliently accommodate movement of that roller in a left hand direction (as viewed in FIG. 3) during the cassette insertion process.

OPERATION OF THE PREFERRED EMBODIMENT

To summarize the operation of the preferred embodiment of this invention, the cassette 10 is initially furnished with substantially all of the film strip 34 in an unexposed condition coiled on the supply spool 30, with the processing fluid contained in the rupturable pod 48 and with the actuator 70 disposed in its position shown in FIG. 1. For exposure purposes, the cassette 10 is mounted in an appropriate camera (not shown) with the drive means of the camera engaging the recess 136 of the takeup spool 32 through a friction clutching arrangement as is conventional. While the particular camera employed does not form part of the present invention, it may advantageously take the form of that described in the aforementioned copending application Ser. No. 813,427 filed Apr. 4, 1969. It will be noted that the camera described in that application includes a door-mounted pin which automatically enters the cassette 10 through its aperture 106 to snub the idlers 44 and 46 whenever the cassette is mounted therein. The aperture plate of the camera, which may also take a conventional form, operably engages the cassette's pressure plate assembly 1 166 to position the section of the film strip 34 disposed thereacross in the proper focal plane. Also, a conventional intermittent film advancement mechanism of the camera engages the perforations 36 of the film strip 34 to effect proper step advancement of the film strip along the pressure plate assembly 116. In this manner, the operator can selectively record images on the photosensitive film strip 34 as it traverses the cassette's opening 28 on its way from the supply spool 30 to the takeup spool 32. In the embodiment illustrated, the photosensitive surface of the film strip 34 faces inwardly of the cassette 10 such that exposure of the photosensitive emulsion is effected through the transparent film base. After the film strip 34 has been completely exposed, the cassette 10 can be quickly removed from the camera and replaced, when desired, by an identical cassette containing unexposed film.

When convenient, the film processing operation can be initiated by first moving the cassette's cover plate 22 and then inserting the cassette into the receiving chamber 144 the processor projector unit 142 intermediate the rollers 166 and 168 and against the force of the compression spring 200. During this insertion process, the fluid containing pod 48 is automatically ruptured and the fluid initially retained therein expelled therefrom through the fluid feeding device into the reservoir chamber 58 of the dispensing container 60. The aforementioned force applying member (not shown) is introduced into the cassette through its elongated slot 79 to effect a displacement of the strip of flexible material 80 from its sealing relationship over the dispensing container's projection 62 into an unsealing relationship therewith and to cause the support plate 82 to slidably engage the film strip 34 against that section of the strip of flexible material disposed over the projection 62.

By now turning an appropriate switch located on the control panel, (not shown), of the processor-projector unit 142, the exposed strip of material is returned from the takeup spool 32 to the supply spool 30. During this sequence, the exposed photographic film strip 34 passes across the dispensing container's projection 62 and draws processing fluid from the reservoir chamber 58 of the container 60 to form a uniform fluid coating along its entire length. In this respect, it will be noted that, with the cassette 10 inserted into the unit 142, the projection 62 is disposed at the lowermost point of the dispensing container 60 so that the force of gravity causes the processing fluid to be continually fed through the projection 62 from the reservoir chamber 58. The thickness of the strip of flexible material 80 is determinative of the thickness of the fluid coating applied to the film strip 34 and the taper 64 provides a relatively sharp doctor blade for applying that coating to the film strip.

The motor of the processor-projector unit 142 is automati- as the entire length of exposed film strip 34 has been treated with processing fluid. At this time, the force applying member of the processor-projector unit 142 engaging the cassette's actuator 70 should be withdrawn from the cassette to permit the actuator to return to its original position, wherein the orifice through the dispensing container's projection 62 is sealed by the strip of flexible material 80, and wherein the film strip 34 is permitted to return to its original position out of contact with the strip of flexible material and the support plate 82. Additionally, the operator should now effect a snubbing of the cassette's idlers 44 and 46. This may be accomplished by displacing a pin (not shown) mounted in the processor-projector unit 142 adjacent the cassette's aperture 106 into engagement with the cassette's resilient member 98.

The processor-projector unit 142 also includes other conventional means not illustrated in the drawings associated with the projection of the visible images recorded on the fully processed film strip 34. These include an aperture plate and an intermittent film advancement mechanism positioned in operable relationship to the cassette's pressure plate assembly 116 through the cassette's opening 28, and a light source positioned in operable relationship to the cassette's opening 96. Additionally, such other conventional means include a shutter mechanism and a lens system. By now turning another switch (not shown) located on the control panel the processor-projector unit 142, that unit's light source and motor are simultaneously energized, in this instance the motor driving both the aforementioned intermittent film advancement mechanism of the unit 142 and the cassette's takeup spool 32 through the drive shaft 204. As the now fully processed film strip 34 is once again drawn across the cassette's opening 28 onto the takeup spool 32, visible images contained thereon are projected for viewing purposes. In this connection, the processor-projector unit's aperture plate acting against the cassette's pressure plate assembly 116 accurately positions a section of the film strip 24 disposed therebetween at the proper film plane for projection purposes. Simultaneously, light rays from the light source of the processor-projector unit 142 enter the cassette 10 through its opening 96 and are redirected by the light reflecting element 118, through the aperture 132 in the pressure plate assembly 116 and the sections of the film strip 34 intermittently positioned thereover, outwardly of the cassette through its opening 28. Again, conventional means (not shown) automatically deenergize the light source and motor of the processor-projector unit 142 once the visible images on the entire processed film strip 34 have been projected.

During these operations the cassette 10 is "locked" in the receiving chamber 144 of the processor-projected unit 142 by the force exerted thereagainst by the rollers 166 and 168, which force firmly seats the cassette against the standoffs 162 mounted between the support plates 150 and 152.

Preferably, the film strip 34 is returned from the takeup spool 32 to the supply spool 30 before removing the cassette 10 from the processor-projector unit 142. Removal of the cassette 10 from that unit 142 is effected by the operator's depressing the button 186 from its initial position as shown in FIG. 3 of the drawings to its position shown therein in phantom, at which time the roller 168 is withdrawn from contact with the cassette 10 and the force of the compressed spring 200 ejects the cassette from the receiving chamber 144.

DESCRIPTION OF AN ALTERNATE EMBODIMENT

An alternate embodiment of this invention is illustrated in FIGS. 5 and 6 of the drawings. The same numerals primed are employed in those figures to denote the parts of that embodiment which remain substantially unchanged from the embodiment illustrated in the other figures of the drawings.

In this embodiment, the rollers 166' and 168' are arranged so that they do not extend over the end of the cassette furtherest removed from the end thereof seated against the standoffs 162' when the cassette is fully inserted into the Thus, at such time, these rollers 166' and 168' do not exert a force against the cassette 10' urging the cassette against the standoffs 162'. In order to lock the cassette 10' in its fully inserted position within the receiving chamber 144', the outside face of the housing member 12' is provided with a recess 206 adapted to be releasably engaged by a latch 208 pivotally mounted within an opening 210 of the support plate 152'. The end of the latch 208 extending exteriorally of the receiving chamber 144' is pivotally connected to one end of the connecting member 212, the other end of which connecting member is pivotally attached to one of the arms 172' of the overcenter mechanism 170'.

It will thus be seen that, as the cassette 10' is inserted into the receiving chamber 144' against the force exerted thereon by the compression spring 200', the roller 168' exerts a force progressively across the rupturable pod 48' and the fluid feeding device 52' of the button 186' displaces the roller 168' into a position wherein causing the pod's weakened seal 50' to rupture and the processing fluid to be expelled from that pod into the dispensing container's reservoir chamber. When fully inserted into the receiving chamber 144', the latch 208 automatically enters the cassette's recess 206 to lock the cassette in position against the force exerted thereon by the loaded spring 200'. After the film processing and/or projecting operations have been completed, the operator can effect an ejection of the cassette 10' from the processor-projector unit 142' by depressing the button 186'. Such a depression of the button 186' displaces the roller 168' into a position, wherein it exerts little or no force against the cassette 10' and simultaneously withdraws the latch 208 from engagement with the cassette's recess 206. When the operator releases the button 186', the force of the spring 190' acting thereon automatically returns the roller 168' and the latch 208 to their original positions within the processor-projector unit 142'.

Although this embodiment of the invention requires additional components to effect a "locking" of the cassette 10 within the receiving chamber 144', it does possess certain advantages relative to the embodiment of the invention illustrated in FIGS. 3 and 4 of the drawings. Specifically, the loaded force of its compression spring 200' may be less than that of the similar spring employed in the first described embodiment. Additionally, it is only necessary for the operator to insert the cassette 10' into the receiving chamber 144' to a point where the end of the cassette furthermost removed from the end thereof seated against the standoffs 162' is virtually flush with the top panel 148' of the processor-projector unit 142'. Both of these aspects of this embodiment of the invention simplify the task of the operator in inserting the cassette 10' into the processor-projector unit 142'. Also, in this embodiment, both rollers 166' and 168' may be formed of either a resiliently compressible material or of a metal such is stainless steel.

Those familiar with the motion picture arts will readily appreciate the novel and highly unique advantages of this invention. Most importantly, efficient and simple means are provided for receiving a film handling cassette containing a rupturable pod of processing fluid, for locking such cassette in position when fully inserted into such receiving means, for rupturing such pod and expelling such fluid therefrom and for subsequently effecting the ejection of such cassette from such receiving means.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What we claim is:

1. Photographic apparatus for processing a strip of exposed photographic material contained in a film handling cassette, such cassette including a container in which processing fluid is initially stored, such container having a portion adapted to release such fluid when such fluid is subjected to a predetermined pressure responsive to a force applying member being pressed against such container, an applicator, means for feeding such fluid to such applicator when such portion of such fluid is released from such container and means adapted to be driven by external driven means for progressively advancing such strip of exposed photographic material across such applicator, comprising:

first means for receiving such cassette;
   second means for automatically expelling such fluid from such container in the process of inserting such cassette into said first means, said second means including an overcenter mechanism, a force applying member mounted on said overcenter mechanism and means engaging said mechanism for selectively reversibly displacing said mechanism between a first position, wherein said force applying member is located to progressively exert a compressible force against such container as such cassette is inserted into said first means, and a second position wherein said force applying member is located so as not to exert any substantial force against such cassette when such cassette is disposed within said first means; and
   third means for selectively driving such advancing means of such cassette.

2. The apparatus of claim 1 wherein said force applying member comprises a roller.

3. The apparatus of claim 2 additionally including a second roller positioned to progressively engage sections of such cassette on the opposite side thereof from said first mentioned roller as such cassette is inserted into said first means whereby said second roller supports such cassette against the force exerted thereon by said first mentioned roller during such insertion process.

4. The apparatus of claim 1 wherein said first means includes a support against which such cassette seats when fully inserted into said first means and said mechanism urges said force applying member against such cassette, when such cassette is seated against said support and said mechanism is in its said first position, tending to firmly press such cassette against said support.

5. The apparatus of claim 4 wherein at least the portion of said force applying member adapted to engage such cassette is formed of a resiliently compressible material so that, when said mechanism is in its said second position, said portion is compressed by such cassette as such cassette is inserted into said first means and subsequently expands over an end of such cassette spaced from said support when such cassette is seated against said support.

6. The apparatus of claim 5 wherein said force applying member comprises a roller.

7. The apparatus of claim 6 additionally including a second roller having at least its peripheral edge portion formed of a resiliently compressible material and positioned to progressively engage sections of such cassette on the opposite side thereof from said first mentioned roller as such cassette is inserted in said first means, thereby compressing said portion of said second roller and supporting such cassette against the force exerted thereon by said first mentioned roller during such insertion process, and to subsequently permit said portion of said second roller to expand over such end of such cassette when such cassette is seated against said support.

8. The apparatus of claim 4 additionally comprising means for ejecting such cassette from said apparatus, said ejection means comprising a spring adapted to be automatically loaded as such cassette is inserted into said first means, the force of said loaded spring tending to eject such cassette from said apparatus.

9. The apparatus of claim 1 wherein such cassette additionally includes means for engaging a latch and said apparatus additionally includes a spring, adapted to be automatically loaded as such cassette is inserted into said first means, the force of said loaded spring tending to eject such cassette from said apparatus, and a releasable latch positioned to be automatically engaged by such latch engaging means when such cassette is fully inserted into said first means to lock such cassette in position against the force exerted thereon by said spring.

10. The apparatus of claim 9 additionally comprising means for connecting said latch to said mechanism so that, when said mechanism is in its said first position, said connecting means positions said latch to be automatically engaged by such latch engaging means whenever such cassette is fully inserted into said first means and so that, when said mechanism is subsequently displaced into its said second position, said connecting means disengages said latch from such latch engaging means.

11. Apparatus for processing a strip of exposed photographic material contained in a film handling cassette, such cassette including a container in which processing fluid is initially stored, such container having a portion adapted to release such fluid when such fluid is subjected to a predetermined pressure responsive to a force applying member being pressed against such container, an applicator, means for feeding such fluid to such applicator when such fluid is released from such container and means adapted to be driven by external drive means for progressively advancing such strip of exposed photographic material across such applicator, comprising:

first means for receiving such cassette;

second means for automatically expelling such fluid from such container in the process of inserting such cassette into said first means and for releasably locking such cassette in position when such cassette is fully inserted into said first means, said second means including an overcenter mechanism, a force applying member mounted on said overcenter mechanism and means engaging said mechanism for selectively reversibly displacing said mechanism between a first position, wherein said force applying member is located to progressively exert a compressible force against such container as such cassette is inserted into said first means and to exert a force against such cassette when such cassette is fully inserted into said first means tending to lock such cassette in position, and a second position wherein said force applying member is located so as to not exert any substantial force against such cassette when such cassette is disposed within said first means;

third means for selectively driving such advancing means of such cassette; and fourth means for selectively ejecting such cassette from said first means.

12. The apparatus of claim 11 wherein said force applying member is resiliently compressible.

13. The apparatus of claim 11 wherein said force applying member comprises a roller.

14. The apparatus of claim 13 additionally including a second roller positioned to progressively engage sections of such cassette on the opposite side thereof from said first mentioned roller as such cassette is inserted into said first means and said mechanism is in its said first position whereby said second roller supports such cassette against the force exerted thereon by said first mentioned roller during such insertion process.

15. The apparatus of claim 11 wherein said first means includes a support against which such cassette is seated when fully inserted into said first means and said mechanism urges said force applying member against such cassette, when such cassette is seated against said support and said mechanism is in its said first position, tending to firmly press such cassette against said support.

16. The apparatus of claim 15 wherein said force applying member comprises a roller.

17. The apparatus of claim 15 wherein said fourth means includes a spring adapted to be automatically loaded as such cassette is inserted into said first means, the force of said loaded spring tending to eject such cassette from said apparatus.

18. Photographic apparatus useful in operations involving a film handling cassette including a strip of photographic material and means adapted to be driven by external drive means for advancing such strip of photographic material within such cassette, comprising:

first means for receiving such cassette including a support against which such cassette seats when fully inserted into said first means;

second means for locking such cassette in position when fully inserted into said first means, said second means comprising an overcenter mechanism, a force applying member mounted on said overcenter mechanism and means engaging said mechanism for selectively reversibly displacing said mechanism between a first position, wherein said force applying member exerts substantially no force against such cassette when such cassette is disposed within said first means, and a second position, wherein when such cassette is seated against said support said force applying member urges such cassette firmly against said support;

third means for selectively driving such advancing means of such cassette; and fourth means for ejecting such cassette from said apparatus when such cassette is seated against said support and said mechanism is displaced into its said first position.

19. The apparatus of claim 18 wherein said force applying member comprises a roller.

20. The apparatus of claim 18 wherein said force applying member comprises a roller having at least its peripheral edge portion formed of a resiliently compressible material and said second means additionally includes a second roller having at least its peripheral edge portion formed of a resiliently compressible material, said rollers being positioned when said mechanism is in its said second position to engage such cassette and to have their said portions compressed by such cassette as such cassette is inserted into said first means and so that their said compressed portions subsequently expand over an end of such cassette spaced from said support when such cassette is seated against said support to urge such cassette against said support.

21. The apparatus of claim 18 wherein said fourth means comprises a spring adapted to be automatically loaded as such cassette is inserted into said first means, the force of said loaded spring tending to eject such cassette from said apparatus against the force exerted thereon by said force applying member when said mechanism is displaced into its said second position.